(12) United States Patent
Vengurlekar et al.

(10) Patent No.: US 11,877,029 B2
(45) Date of Patent: Jan. 16, 2024

(54) SMART MEDIA RECOMMENDATIONS BY EVENTS

(71) Applicant: Sony Interactive Entertainment LLC, San Mateo, CA (US)

(72) Inventors: Harshank Dilip Vengurlekar, San Jose, CA (US); Madhur Kamalapurkar, San Jose, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/341,268

(22) Filed: Jun. 7, 2021

(65) Prior Publication Data

US 2022/0394335 A1 Dec. 8, 2022

(51) Int. Cl.
*H04N 21/45* (2011.01)
*H04N 21/475* (2011.01)
*H04N 21/458* (2011.01)

(52) U.S. Cl.
CPC ....... *H04N 21/4532* (2013.01); *H04N 21/458* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 2010/0333137 A1* | 12/2010 | Hamano | H04N 21/458 725/39 |
| 2012/0204201 A1* | 8/2012 | Cassidy | H04N 21/258 725/10 |
| 2016/0057188 A1 | 2/2016 | Padmanabhan et al. | |
| 2017/0188098 A1 | 6/2017 | In | |
| 2017/0195398 A1* | 7/2017 | Sharma | H04L 67/10 |
| 2020/0125921 A1 | 4/2020 | Manico et al. | |
| 2020/0175058 A1* | 6/2020 | Peirce | G06Q 10/101 |
| 2021/0248136 A1* | 8/2021 | Panuganty | G06F 16/2453 |

OTHER PUBLICATIONS

"International Search Report and Written Opinion", dated Oct. 6, 2022, from the counterpart PCT application PCT/US22/30265.

* cited by examiner

*Primary Examiner* — Jefferey F Harold
*Assistant Examiner* — Charles N Hicks
(74) *Attorney, Agent, or Firm* — John L. Rogitz; John M. Rogitz

(57) ABSTRACT

A technique allows curating content such as videos to be specific to some event/theme. The technique allows creating an event in a calendar, and a backend system internally has an algorithm to pick the movies/TV shows based on viewing history.

20 Claims, 4 Drawing Sheets

SMART MEDIA RECOMMENDATIONS BY EVENTS

FIELD

The present application relates to technically inventive, non-routine solutions that are necessarily rooted in computer technology and that produce concrete technical improvements.

BACKGROUND

As understood herein, video content operators often experience difficulty curating their videos specific to some event/theme.

SUMMARY

Present principles facilitate creating an event in a calendar such as the media operations tool (MOTO) calendar, and a backend system internally executes an algorithm to select the video (movies/TV shows) based on user viewing history. The backend system may include one or more of a computer game console and a computer game server streamlining games to a display.

A device includes at least one computer memory that is not a transitory signal and that in turn includes instructions executable by at least one processor to access at least a first computer-stored calendar and identify at least a first event on the first computer-stored calendar. The instructions are executable to, based at least in part on the first event, create a content strand, and present the content strand on at least a first display.

In example embodiments the instructions may be executable to present the content strand on at least a first display at a time in advance of the first event according to an advance period determined from a start time of the first event. In some implementations the first event can include a start time of a video or a holiday.

In example embodiments the instructions may be executable to, based at least in part on the first event and at least a first user profile, create the content strand. In some embodiments the instructions can be executable to, based at least in part on the first event and at least a first platform objective, create the content strand. The platform objective may include promoting at least a first genre of audio-video content. If desired, the instructions may be executable to remove from the content strand content already viewed by a user to whom the content strand is presented and/or remove from the content strand content having negative reviews. The first content strand may include a series of audio-video clips, or thumbnail images, or a mix of both.

In another aspect, a method includes accessing a calendar and also accessing a corpus of audio-video content. Further, the method includes creating a data structure of plural video clips selected from the corpus of audio-video content according to at least one element of the calendar. The method entails presenting on a display the data structure.

In another aspect, an apparatus includes at least one computer simulation controller configured to control at least one computer simulation being presented on at least one display. The apparatus further includes at least one source of the computer simulation configured to send the computer simulation to the display. The apparatus also includes at least one processor configured to access at least one calendar tool associated with the source of the computer simulation and based at least in part on at least one event in the calendar tool, present on the display a series of images.

The details of the present application, both as to its structure and operation, can best be understood in reference to the accompanying drawings, in which like reference numerals refer to like parts, and in which:

DETAILED DESCRIPTION

Figure 1:
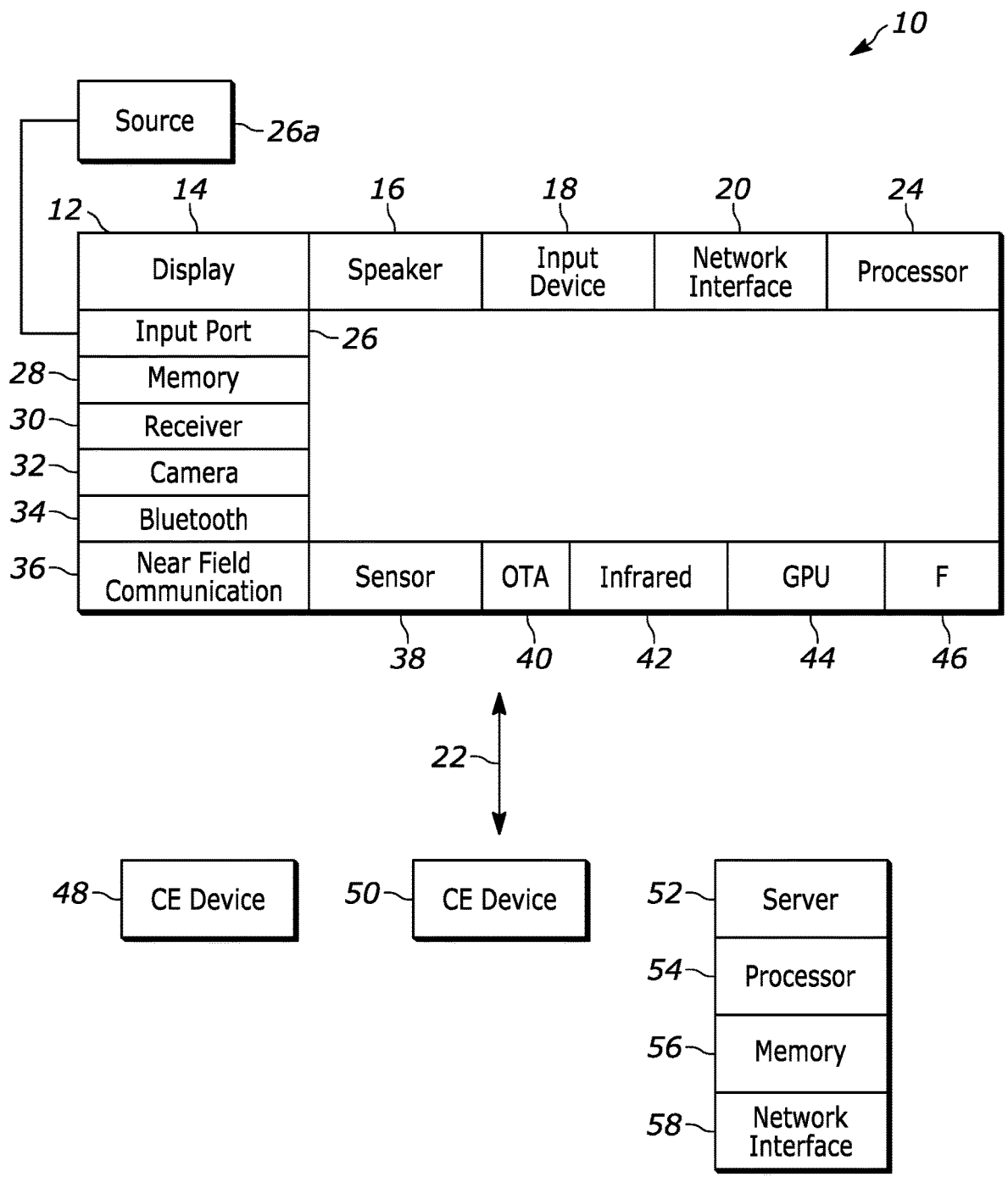
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
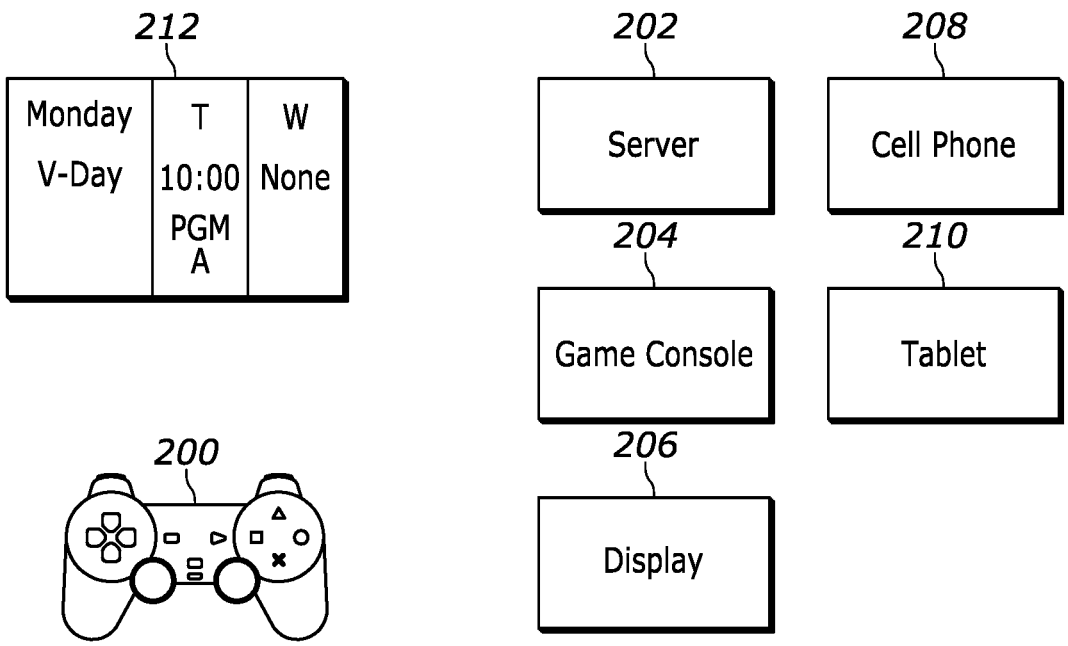
FIG. 2 illustrates an example system block diagram.

FIG. 2 illustrates a system that includes one or more computer simulation (such as computer game) controllers 200 such as a PlayStation® controller. The controller 200 may control a computer simulation sourced from one or more of a remote server 202 communicating with components over a wide area network and one or more computer simulation (such as computer game) consoles 204 such as a PlayStation® console to present a computer simulation (such as a computer game) on one or more displays 206, which may include visual displays and audio speakers. A media space may exist on the game console 204 which includes computer-stored calendars with events.

Calendars also may exist on ancillary devices communicating with components in FIG. 2, including a cell phone 208 and a tablet computer 210. Any of the devices shown in FIG. 2 may include processors and storage media as described in reference to FIG. 1, and any one or more of the processors of the components shown in FIG. 2 may execute logic herein, including obtaining calendar information including calendar events by querying other device for calendars, such as by requesting files or other data structures with a file name extension indicating "calendar".

An example calendar data structure 212 is shown in FIG. 2. The calendar 212 typically includes days 214 and times 216 within the days of events. The events may include, e.g., holidays such as Valentine's day ("V-day" in FIG. 2) and start times of audio-video events ("PGM A" in FIG. 2). The events typically are associated with computer-readable metadata indicating the times and types of the events.

Figure 3:
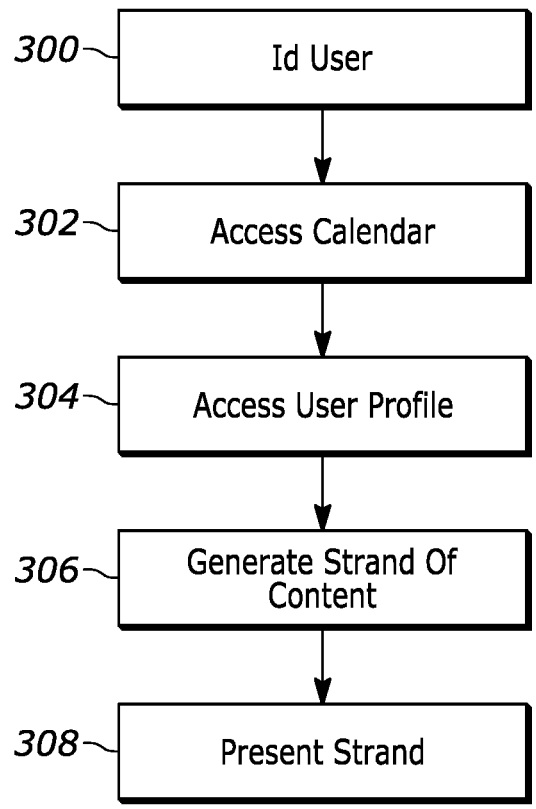
FIG. 3 illustrates example overall logic in example flow chart format, it being understood that state logic equivalently may be used.

FIG. 3 illustrates example logic in example flow chart format, it being understood that state logic may be implemented achieving the same steps as those illustrated, and that the steps may be performed in orders other than that shown to achieve the logical outcome. Commencing at block 300, a current user of the system shown in FIG. 2 may be identified. This may be done by accessing the login credentials of the user, or by executing image recognition on a photograph of the user taken by a camera associated with any of the example device in FIG. 2. Similarly, the user may be identified using voice recognition on signals sensed by a microphone associated with any of the example device in FIG. 2.

Regardless of how the user is identified, the logic may access one or more calendars of one or more of the devices shown in example FIG. 2 at block 302. The calendars may be accessed as described previously. A profile associated with the user identified at block 300 may be accessed at block 304 to determine what content the user likes. The profile may be based exclusively on prior content the user has watched, and/or the profile may include demographic-related affinities of the user as determined by user-input or network-gathered demographics of the user identified at block 300, as well as other information.

Proceeding to block 306, based on at least one event in the calendar(s) accessed at block 302, a strand of content is generated. A strand of content may include one or more of a series of audio-video clips and/or thumbnail photographs representing respective content and may be played in the order in which the content is located in the strand. The strand may be navigable using, e.g., the computer game controller 200 in FIG. 2 to select specific content parts of the strand to present full screen on the display 206. The content in the strand may be selected from a corpus of content such as a corpus of movies from a particular service or provider, or from a curated corpus constructed by a provider of the system shown in FIG. 2, or indeed from the Internet at large.

The next event in the calendar may be selected as the key event to which content is mapped, or an event further in the future than the next event may be selected. For example, if the next event is a holiday, the strand may include content themed around that holiday. If the next event is a movie starring Actor A, the strand may include a series of video clips of other movies starring Actor A. The event to which the strand content is keyed may be selected based on an inference of importance of the event. For example, if a user entered an event into a calendar, that event may be inferred to be more important than an event automatically entered into the calendar by the calendar software, such as a national holiday. The inverse may be true, i.e., an automatically entered event may be considered more important than a user-entered event and thus may be used in lieu of the user-entered event to construct the strand. Or, a user may view a calendar and select an event using, e.g., the controller 200 to be the event around which creating a strand is keyed.

If desired, the strand may also account for user preferences derived from the user profile accessed at block 304. For example, if the user has watched mystery films, the strand may include only or primarily mystery films. Continuing with the examples above, if the event is a holiday the strand may include only or primarily content related to mystery films with the holiday in question as a theme. If the event is a movie with Actor A, the strand may include only or primarily mystery films in which Actor A starred. The strand is then presented on the display 206 at block 308.

Figure 4:
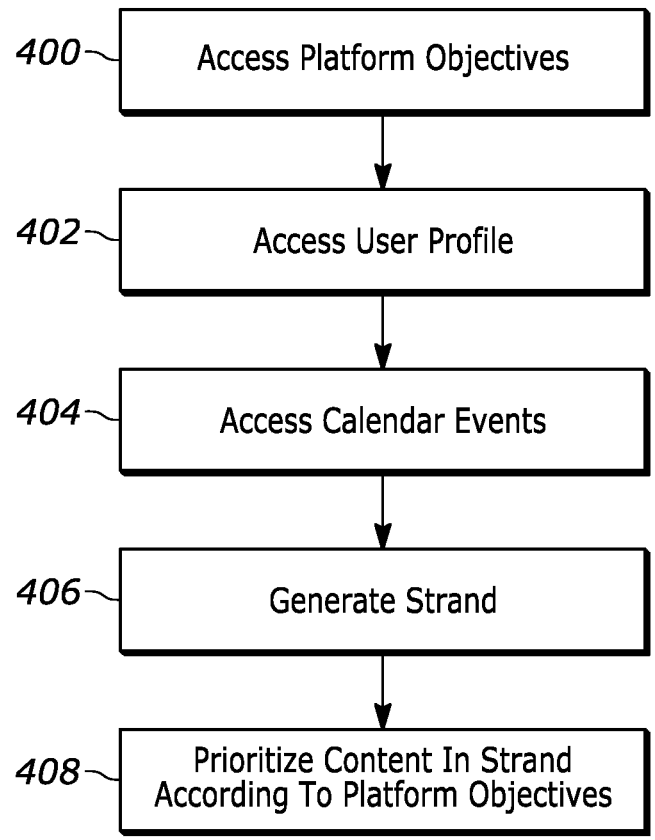
FIG. 4 illustrates example logic details in example flow chart format.

FIG. 4 illustrates additional optional features that instant techniques may employ. Commencing at block 400, platform objectives may be accessed. For example, the company providing either the computer game equipment shown in FIG. 2, or the producer of content associated with an event to which a strand of content is to be keyed, may publish to the processor executing the techniques herein a preference to promote a particular genre of audio video (AV) content, such as a particular computer game genre or movie genre.

Proceeding to block 402, the user profile may be accessed as described above. One or more calendar events may be accessed at block 404 as described above. A content strand is generated at block 406 based on the user profile, calendar events, and platform objectives. For example, to continue to the example above, the strand may include clips or thumbnails of mystery movies starring Actor A along with clips or thumbnails of content satisfying the platform objectives accessed at block 400.

Moreover, block 408 indicates that the order of the clips/thumbnails in the strand may be prioritized based on the platform objectives accessed at block 400. For example, clips/thumbnails of content satisfying the platform objectives accessed at block 400 may be presented before clips/thumbnails representing other content.

Thus, calendaring of upcoming activity may be linked to a user profile to a platform objective to define contents and sorting thereof.

Figure 5:
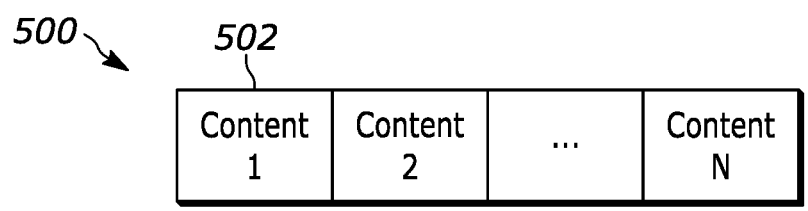
FIG. 5 illustrates an example content strand.

FIG. 5 schematically shows a strand 500 of content that includes plural content clips and/or thumbnails 502 in an order from left to right, with the first (left-most) clip or thumbnail being played before the second and so on subject to user selection of a content clip and/or thumbnail 502 from a graphical representation of the strand for immediate presentation full screen of the selected content.

Figure 6:
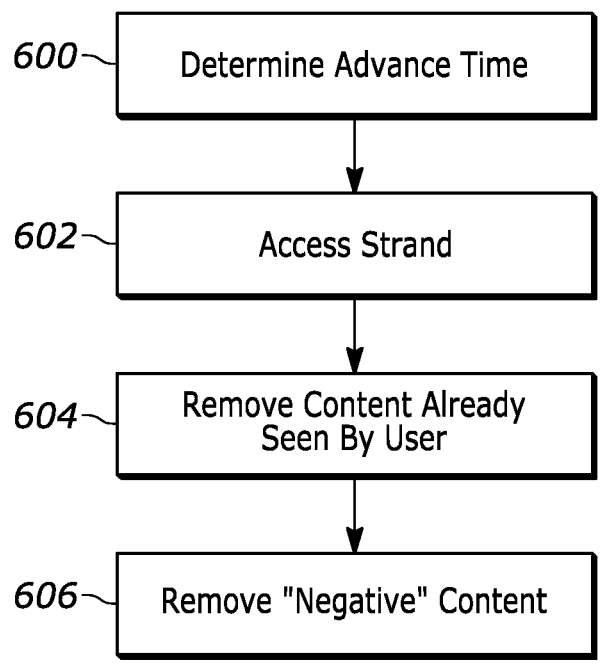
FIG. 6 illustrates further example logic details in example flow chart format.

FIG. 6 illustrates that at block 600, and advance time may be determined. This may be done by accessing a predetermined advance period established by, e.g., the provider of a computer game console or by the provider of a calendar software or by a content and then determining the start time of a calendar event to which creation of a strand is keyed. The start time for playing the strand may then be determined by subtracting the predetermined advance period from the event start time. The advance period may be days, or hours, or minutes in advance of a particular calendar event and may vary from event to event.

The strand is accessed at block 602, and at block 604 any content in the strand identified as having been viewed by the user identified in FIG. 3 may be removed from the strand. Similarly, at block 606 any comment with negative connotations, such as a threshold number of dislikes or threshold ratio of likes to dislikes or other indicia of negative viewer sentiment may be removed from the strand, prior to presenting the strand.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer memory that is not a transitory signal and that comprises instructions executable by at least one processor to:
access at least a first computer-stored calendar comprising user-entered events and automatically entered events;
identify an importance relationship between the user-entered events and automatically entered events;
based at least in part on the importance relationship, identify at least a first event on the first computer-stored calendar;
based at least in part on the first event, create a content strand;
present the content strand on at least a first display.

2. The device of claim 1, wherein the instructions are executable to:
present the content strand on at least a first display at a time in advance of the first event according to an advance period determined from a start time of the first event.

3. The device of claim 1, wherein the first event comprises a start time of a video.

4. The device of claim 1, wherein the first event comprises a holiday.

5. The device of claim 1, wherein the instructions are executable to:
based at least in part on the first event and at least a first user profile, create the content strand.

6. The device of claim 1, wherein the instructions are executable to:
based at least in part on the first event and at least a first platform objective, create the content strand.

7. The device of claim 6, wherein the platform objective comprises at least a first genre of audio-video content.

8. The device of claim 1, wherein the instructions are executable to:
ensure the content strand does not include content already viewed by a user to whom the content strand is to be presented.

9. The device of claim 1, wherein the instructions are executable to:
remove from the content strand content having negative reviews.

10. The device of claim 1, wherein the first content strand comprises a series of audio-video clips.

11. The device of claim 1, comprising the at least one processor.

12. A method, comprising:
accessing a calendar comprising at least first and second events, the first event being a user-entered event, the second event being an automatically entered event;
selecting the first event based on an inference that user-entered calendar events are more important than automatically entered calendar events;
accessing a corpus of audio-video content;
creating a data structure comprising plural video clips selected from the corpus of audio-video content according to at least the first event of the calendar; and
presenting on a display the data structure.

13. The method of claim 12, comprising creating the data structure based on a user profile.

14. The method of claim 12, comprising presenting the data structure at a time in advance of the first event of the calendar according to an advance period determined from a start time of the first event.

15. The method of claim 12, wherein the data structure comprises a series of video clips and the first event comprises a calendar event.

16. The method of claim 12, wherein the data structure comprises a series of thumbnail images.

17. The method of claim 12, comprising creating the data structure based on a first platform objective.

18. An apparatus comprising:
at least one computer simulation controller configured to control at least one computer simulation being presented on at least one display;
at least one source of the computer simulation configured to send the computer simulation to the display; and
at least one processor configured to:
access at least one calendar tool associated with the source of the computer simulation, the calendar tool comprising at least first and second events, the first event being a user-entered event, the second event being an automatically entered event;
select the second event based on an inference that automatically entered calendar events are more important than user-entered events; and
based at least in part on at least the second event in the calendar tool, present on the display a series of images.

19. The apparatus of claim 18, wherein the processor is embodied in the source and the source comprises at least one computer game console.

20. The apparatus of claim 18, wherein the processor is embodied in the source and the source comprises at least one server communicating with the display over a wide area computer network.

* * * * *